United States Patent [19]

Ikeda

[11] Patent Number: 5,002,621
[45] Date of Patent: Mar. 26, 1991

[54] METHOD OF PRODUCING TIRE REINFORCING MEMBER

[75] Inventor: Kazunari Ikeda, Kodaira, Japan

[73] Assignee: Bridgestone Corporation, Tokyo, Japan

[21] Appl. No.: 329,906

[22] Filed: Mar. 28, 1989

[30] Foreign Application Priority Data

Mar. 30, 1988 [JP] Japan .................................. 63-74460

[51] Int. Cl.$^5$ ............................................. B29C 65/00
[52] U.S. Cl. ..................... 156/177; 156/179; 156/440; 156/494
[58] Field of Search ............... 156/176, 177, 178, 179, 156/436, 437, 440, 494; 242/147 R, 155 R, 156

[56] References Cited

U.S. PATENT DOCUMENTS

| | | | |
|---|---|---|---|
| 1,800,179 | 4/1931 | Darrow | 156/177 |
| 3,314,841 | 4/1967 | Romanin | 156/179 |
| 3,511,739 | 5/1970 | Hebbling | 156/179 |
| 3,700,012 | 10/1972 | Alderfer | 156/179 |
| 3,726,753 | 4/1973 | Marzocchi et al. | 156/179 |
| 3,941,637 | 3/1976 | Masuda et al. | 156/494 |
| 4,600,456 | 7/1986 | Oswald | 156/177 |
| 4,769,202 | 9/1988 | Erosker et al. | 156/440 |
| 4,909,878 | 3/1990 | Watanabe | 156/494 |

FOREIGN PATENT DOCUMENTS

| | | |
|---|---|---|
| 47-13684 | 7/1972 | Japan . |
| 47-20807 | 10/1972 | Japan . |
| 47-34576 | 11/1972 | Japan . |
| 52-8084 | 1/1977 | Japan . |
| 52-91967 | 8/1977 | Japan . |
| 61-502877 | 12/1986 | Japan . |
| 0018495 | of 1909 | United Kingdom ................ 156/179 |
| 0770037 | 3/1957 | United Kingdom ............ 242/155 R |
| 0964102 | 7/1964 | United Kingdom ............ 242/147 R |
| 1099169 | 1/1968 | United Kingdom ............ 242/155 R |

Primary Examiner—Caleb Weston
Assistant Examiner—Steven D. Maki
Attorney, Agent, or Firm—Sughrue, Mion, Zinn, Macpeak & Seas

[57] ABSTRACT

A method is used for producing reinforcing members preferably used in tires. The method comprises steps of causing cords to pass through a plurality of small apertures of a guide plate each for one of the cords to arrange these cords in a predetermined positional relation, winding the cords about winding type braking means, and extending the cords about a dancer roller. Thereafter, the cords are caused to pass through a plurality of small apertures of a movable guide plate each for one of the cords. The movable guide plate is reciprocatively moved in horizontal directions perpendicular to advancing directions of the cords so that the cords are reciprocatively moved onto a calender for rubber coating provided closely adjacent the movable guide plate to embrace the cords in the form of waves between rubber sheets and coat the cords by the rubber sheets, thereby obtaining the reinforcing member. Shapes of the waves of the cords can be modified by changing traverse distances of the movable guide plate and relative speeds between rotating speeds of the calender and reciprocatively moving speeds of the movable guide plate.

5 Claims, 6 Drawing Sheets

FIG_1
PRIOR ART

FIG_2
PRIOR ART

FIG_3

PRIOR ART

FIG_5

FIG_6

FIG_7

FIG_8

FIG_9

METHOD OF PRODUCING TIRE REINFORCING MEMBER

BACKGROUND OF THE INVENTION

This invention relates to a method of producing reinforcing members to be used in tires and having elongations which do not detrimentally affect tire performance and enable stresses to be uniformly distributed in width directions without any stress concentration.

Rubber members having cords embedded therein have been widely used as elastic members having a cut-resistant property in various fields. When such elastic members are used in structures subjected to various external forces such as tires, in addition to the cut-resistant property they are required to have elongations to an extent such that they do not affect tire performance.

From this viewpoint, there have been elastic members realizing suitable elongations with the aid of wave-shaped cords embedded therein. Various kinds of methods of producing such elastic members have been proposed.

Figure 1:
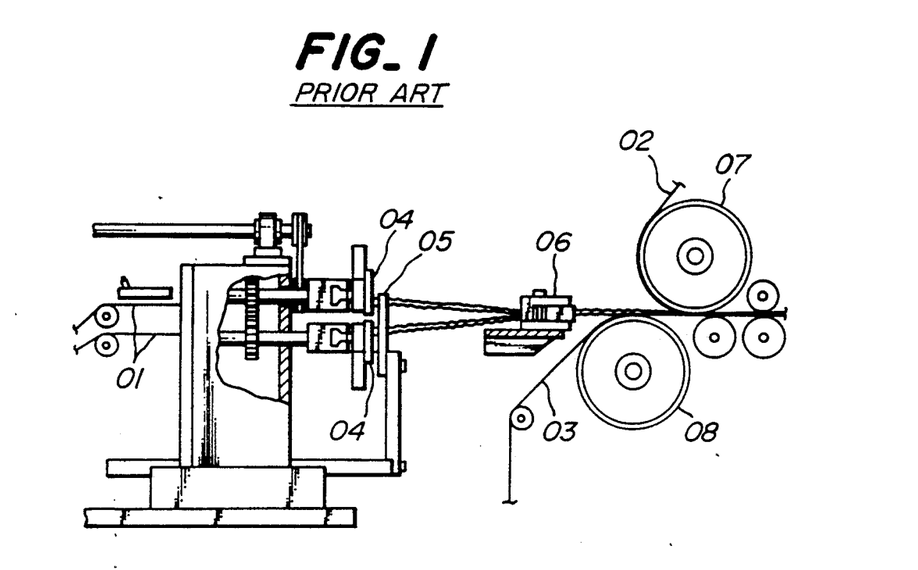
FIGS. 1-3 are drawings for explaining methods of producing reinforcing members of the prior art.

A few of the methods will be explained herein referring to FIGS. 1-3.

A first example is a spiral stripe method disclosed in Japanese Patent Application Laid-open No. 47-13,684. As shown in FIG. 1, stripes 01 are embraced between rubber-like elastic members 02 and 03 and embedded therein. On the way of supplying the stripes, they are caused to pass through a fixed pattern plate 05 and working pattern plates 04 moved along orbits of circular arcs, so that the stripes 01 are permanently spirally set or deformed. After the deformed stripes 01 have passed through a guide unit 06, they are pressed between rubber-like elastic members 02 and 03 by means of upper and lower pressure guide rollers 07 and 08 to form a rubber-like reinforced elastic structure having wave-shaped stripes embedded therein.

Figure 2:
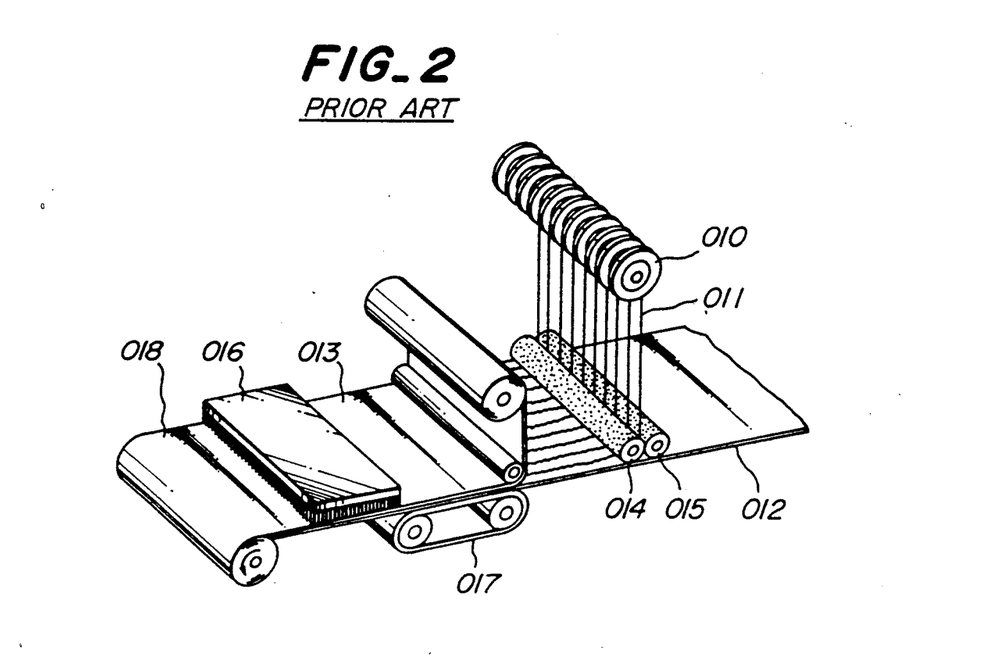

As second example shown in FIG. 2 is a gear setting method disclosed in Japanese Patent Application Laid-open No. 52-91,967. One fiber web 012 is transferred in its longitudinal direction by a chain conveyor 017. A plurality of fiber yarns 011 are supplied onto an upper surface of the chain conveyor 017 with substantially equal intervals in its width directions.

In order to supply the fiber yarns, a pair of gear-shaped rollers 014 and 015 are used, which have on their outer circumferences a plurality of crests and valleys. Fiber stripes 011 are supplied from a creel 010 and passed through the rollers 014 and 015 immediately before they arrive onto the upper surface of the web 012 so that the stripes 011 are shaped into wave-forms with substantially equal pitches in their lengthwise.

At a location where the fiber web 012 supporting the plurality of the wave-shaped fiber stripes 011 has been somewhat transferred in the longitudinal direction, another fiber web 013 is supplied onto the fiber stripes 011. The assembled stripes and webs are then subjected to needle-punching by means of needling means 016 to obtain an unwoven cloth 018.

Figure 3:
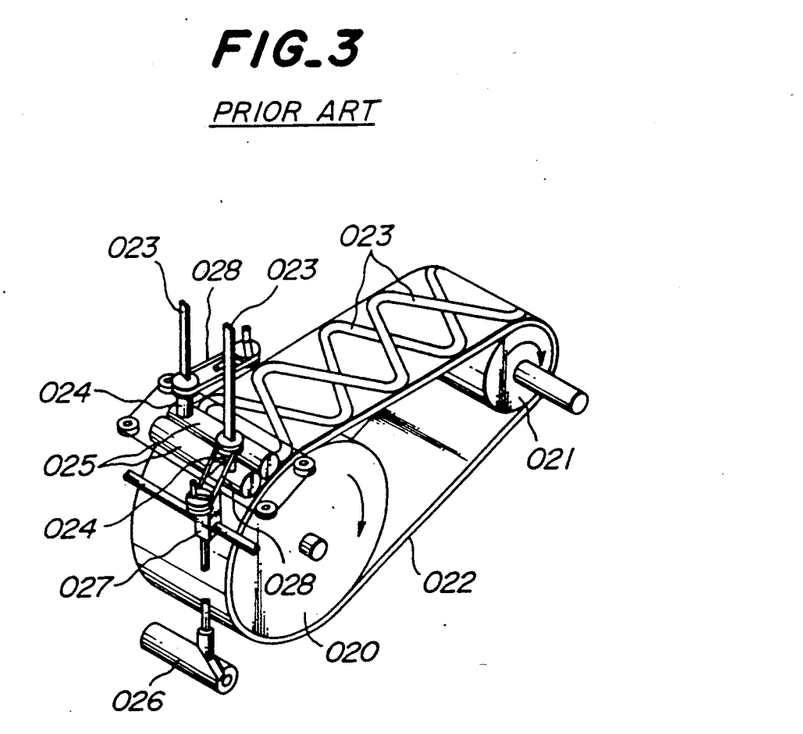

A third example shown in FIG. 3 is a zigzag belt method disclosed in Japanese Patent Application Laid-open No. 61-502,877. A flexible endless belt 022 extends about cylindrical members 020 and 021. Coated continuous cord reinforcing stripes 023 in the form of waves are shaped in wave-forms on the endless belt 022.

In more detail, the continuous cord reinforcing stripes 023 are supplied through suitably shaped grooves in matching means 024 and between rollers 025 and 026 rotating in opposite directions and forcing the stripes 023 against the endless belt 022.

The matching means 024 is connected through control belts 028 to a support 027 reciprocatively driven by means of a cylindrical cam device 026.

The cord reinforcing stripes 023 are thus supplied onto the endless belt 022 in zigzag patterns over the width of the endless belt 022.

Among the above three examples, in the spiral stripe method and the gear setting method of the first and second examples, stripes susceptible to plastic deformation such as steel cords are easy to be permanently set into wave-forms. However, these methods could not be used for soft cords such as chemical fibers because they are difficult to be permanently set.

Moreover, it is difficult to make uniform pitches and intervals of the waves of cords. Unevenness in wave in width directions and overlaps of cords often occur which would cause stress concentration and in many cases detrimentally affect life of tires and become one source of troubles in tire.

Further, modification in wave-form could not be easily carried out so that these methods could not meet various needs in the field.

In case of cords being overlapped, thicknesses of formed reinforcing members become uneven so that tire performance is detrimentally affected. Moreover, air is accumulated in the overlapped portions of cords. In worst cases, the accumulated air may cause separation of reinforcing members.

In the zigzag belt method of the third example, the coated cord reinforcing stripes are used so that an apparatus for coating the cords is needed. In the method, such coated cords are arranged one upon the other so that the air is likely to be accumulated between the cords.

In the zigzag belt method, moreover, the number of the coated cords arranged on the endless belt during one operation cycle is so limited that production efficiency remains at low value.

SUMMARY OF THE INVENTION

It is a primary object of the invention to provide an improved method of producing tire reinforcing members, which eliminates all the disadvantages of the prior art and which is able to use high strength chemical fibers as Kevlar and to easily change wave forms of cords to be embedded in reinforcing members and which is carried out by the use of a comparatively simple apparatus.

In order to achieve this object, the method of producing a tire reinforcing member according to the invention comprises steps of causing cords to pass through a plurality of small apertures of a guide plate each for one of the cords to arrange them in a predetermined positional relation, winding the cords about winding type braking means, extending the cords about a dancer roller, causing the cords to pass in parallel through a plurality of small apertures of a movable guide plate each for one of the cords, the movable guide plate being reciprocatively movable in horizontal directions perpendicular to advancing directions of the cords, and feeding the cords reciprocatively moved by the movable guide plate onto a calender for rubber coating provided closely adjacent the movable guide plate to embrace the cords in the form of waves between rubber sheets and coat the cords by the rubber sheets, thereby obtaining the tire reinforcing member.

With the above method, cords snugly arranged by the guide plates are fed through the winging type braking means and the dancer roller and caused to pass through the small apertures of the movable guide plate. Therefore, the cords upstream of the movable guide plate are maintained under a predetermined tensile force with the aid of the winding type braking means. Moreover, any slack in the cords caused by the reciprocative movements of the movable guide plate is taken up by the dancer roller so that cords are uniformly moved together under the uniform tensile force to the movable guide plate. Therefore, the cords are always stably supplied in this manner.

The cords passed through the movable plate are fed to the calender for rubber coating arranged closely adjacent the movable guide plate. Accordingly, the respective cords are under the predetermined tensile force and embraced between and coated with the rubber sheets, while forming wave-forms.

Therefore, the method according to the invention is applicable to cords insusceptible to plastic deformation such as chemical fibers and the like.

Shapes of the wave-forms of the cords are readily modified by changing traverse distances of the movable guide plate and relative speeds between rotating speeds of the calender and reciprocative moving speeds of the movable guide plate.

Invention will be more fully understood by referring to the following detaned specification and claims taken in connection with the appended drawings.

EXPLANATION OF PREFERRED EMBODIMENTS

Figure 4:
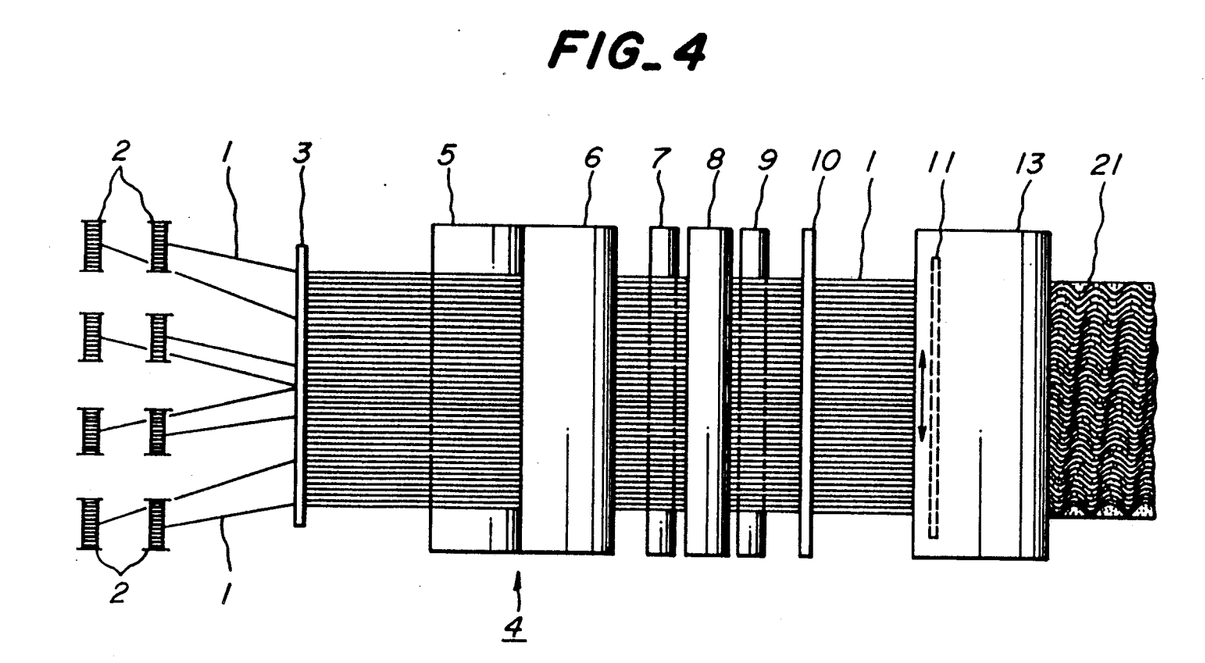
FIG. 4 is a schematic plane view of an apparatus to be used for carrying out one embodiment of the method according to the invention.
Figure 5:
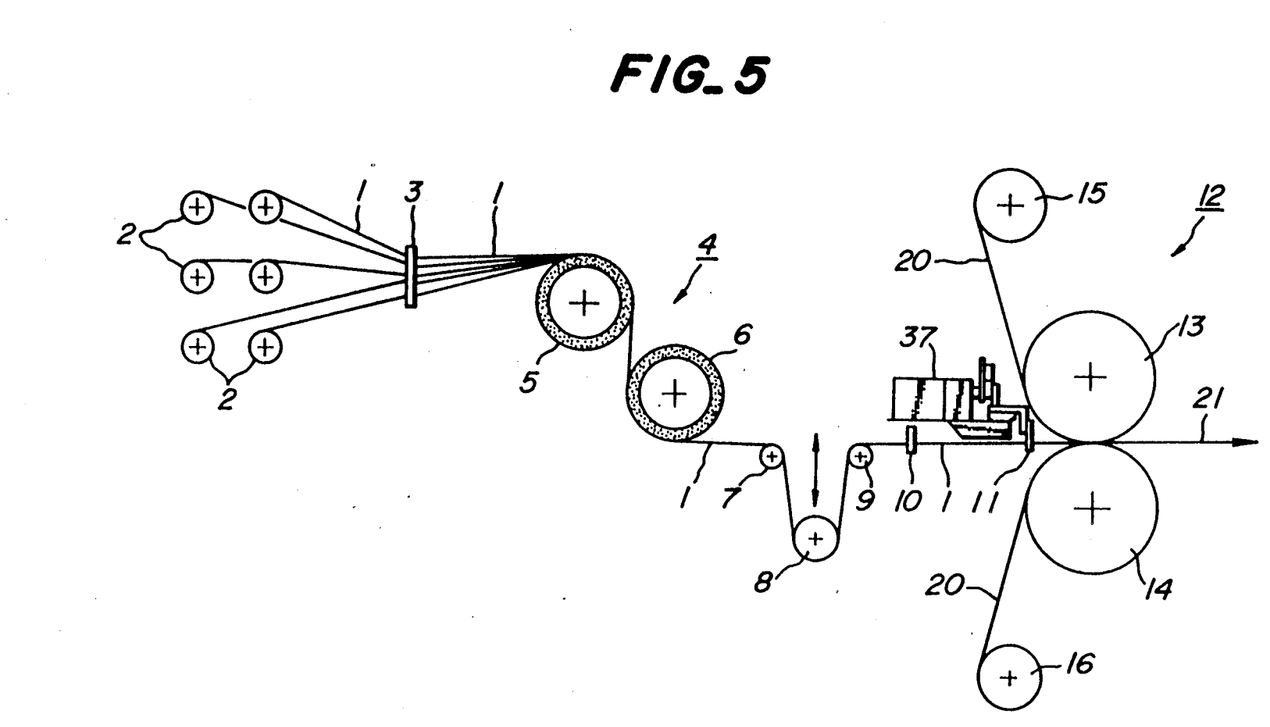
FIG. 5 is a side view of the apparatus shown in FIG. 4.
Figure 6:
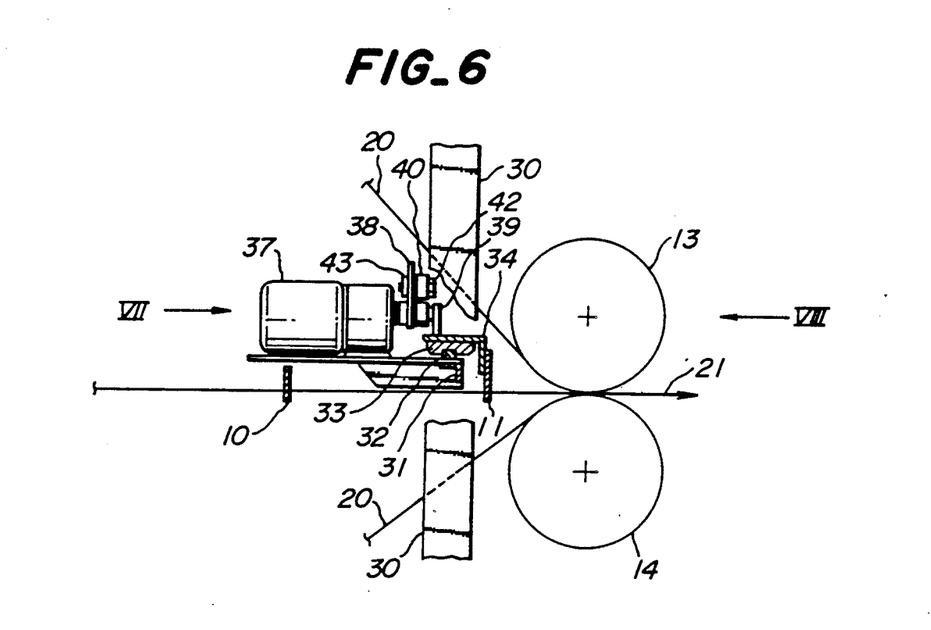
FIG. 6 is a side view illustrating driving means for a movable guide plate of the apparatus shown in FIG. 5.

One embodiment of the invention is shown in FIGS. 4-9. FIG. 4 is a plan view of an apparatus to be used for carrying out the method according to the invention and FIG. 5 is a side view thereof.

A plurality of bobbins 2 are arranged upstream (left side viewed in FIG. 4 or 5) of proceeding lines of cords 1 wound about the bobbins 2. The cords are Kevlar cords of high strength chemical fibers.

The Kevlar is a high strength chemical fiber which is soft but does not undergo plastic-deformation and exhibits very small elongation when being subjected to a load.

The cords 1 paid off the bobbins 2 are drawn to a guide plate 3 and pass through a plurality of small apertures formed at predetermined positions of the guide plate 3.

The cords 1 passed through the guide plate 3 are then wound about winding rolls 5 and 6 of a winding type braking means 4.

The winding rolls 5 and 6 are constructed so that the cords 1 extend about the upstream winding roll 5 over approximately a quarter of a circumference of the roll 5 in a clockwise direction and then extend about the downstream winding roll 6 over approximately a quarter of a circumference of the roll 6 in a counterclockwise direction and are fed to a next station.

The cords 1 are retained in a predetermined positional relation between them by means of the guide plate 3 so that the cords 1 are snugly arranged in the same plane in parallel with each other with equal intervals when the cords extend about the winding roll 5.

When the winding rolls 5 and 6 are being rotated, these rolls 5 and 6 are always subjected to braking action which will obstruct the rotation of the rolls 5 and 6. Therefore, the cords which are being pulled toward the downstream side are given constant tensile forces.

The winding rolls 5 and 6 have large diameters and have large friction because their surfaces are coated with rubber. Therefore, lengths of the cords contacting the rolls are relatively long and coefficients of friction are comparatively large. As a result, the cords 1 are prevented from slipping so that tensile forces in the cords on downstream side can be sufficiently maintained.

After passing the winding roll 6, the cords 1 extend about a fixed roller 7 from above in the clockwise direction. Thereafter, the cords 1 extend about a dancer roller 8 over a lower half of its circumference in the counterclockwise direction and further extend about a fixed roller 9 downstream of the dancer roller 8 in the clockwise direction. In this case, the dancer roller 8 hangs between the fixed rollers 7 and 9.

Therefore, the cords 1 are always forced downward by the dancer roller 8 by gravity, so that upward and downward movements of the dancer roller 8 take up slack in the cords 1.

The cords 1 paid off the fixed roller 9 pass through small apertures of a guide plate 10 and then through small apertures of a movable guide plate 11, respectively. The movable guide plate 11 is reciprocatively movable in a horizontal direction perpendicular to moving directions of the cords 1 so that the cords 1 upstream of the movable guide plate 11 are swung in a horizontal plane. Slack in the cords 1 which may occur in such a horizontal swinging motion of the cords 1 is taken up by the dancer roller 8 as above described.

A calender 12 (see FIG. 5) is arranged downstream of the movable guide plate 11. The calender 12 comprises upper and lower pressing rolls 13 and 14, and a pair of upper and lower feeding rolls 15 and 16 for supplying rubber sheets 20 between the pressing rolls 13 and 14. The cords 1 are embraced between upper and lower rubber sheets 20 fed from the feeding rolls 15 and 16 and pressed with pressure uniform in width directions so that the upper and lower rubber sheets 20 are integrally attached to each other to complete a tire reinforcing member 21.

In this case, the movable guide plate 11 and the pressing portions of the upper and lower pressing rolls 13 and 14 are so closely adjacent each other that the cords 1 are snugly arranged in a horizontal plane by means of the movable guide plate 11 and are brought into an embraced condition between the rubber sheets 20, while the snugly arranged state is maintained.

Vibration of the cords 1 on the upstream side of the movable guide plate 11 which may be caused by the reciprocative movement of the movable guide plate 11 is prevented by the guide plate 10 upstream of the movable guide plate 11.

The movable guide plate 11 is reciprocatively moved with a selected predetermined period. The driving mechanism for the reciprocative movement of the movable guide plate 11 will be explained by referring to FIGS. 6–9.

A horizontal support frame 31 is supported by both support columns 30. A rail 32 is provided extending in horizontal directions on an upper surface of the horizontal support frame 31 along its center.

A slide member 33 is slidably fitted on the rail 32. A support plate 34 having an L-shaped cross-section is fixed to the slide member 33 with an inner surface of a horizontal web of the support plate 34 being fixed to the slide member 33. An upper portion of the movable guide plate 11 long in width direction is fixed to and hangs from an outer surface of a vertical web of the support plate 34 being bent downward on downstream side.

The movable guide plate 11 is formed along its lower edge with a plurality of small apertures 11a arranged in a row which are located below a lower edge of the horizontal support frame 31.

Figure 7:
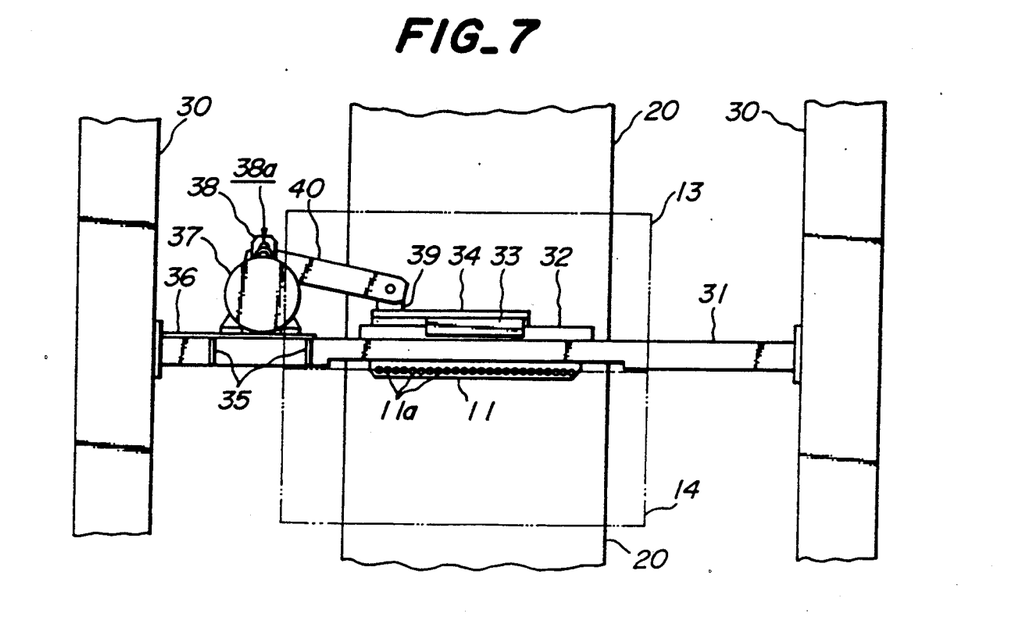
FIG. 7 is a drawing viewed in a direction shown by an arrow VII in FIG. 6.
Figure 8:
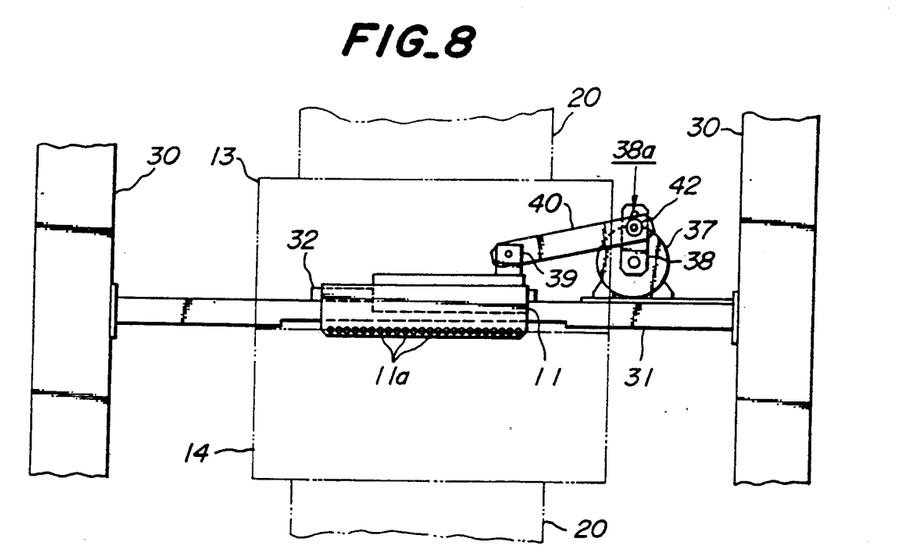
FIG. 8 is a partially removed drawing viewed in a direction shown in an arrow VIII in FIG. 6.

A horizontal base plate 36 extending toward the upstream side is provided on a bracket 35 supported on the horizontal support frame 31 on the left side viewed from the upstream side (FIG. 7). On the horizontal base plate 36 is provided a motor 37 having a driving shaft 37a extending toward the downstream side. A crank 38 is fitted on the driving shaft 37a of the motor 37 and formed with an elongated aperture 38a which is long in a centrifugal direction.

On the other hand, a bearing member 39 is provided on the support plate 34 on a side near to the motor 37. One end of a connecting rod 40 is pivotally connected to the crank 38 and the other end is pivotally connected to the bearing member 39. At the pivotal end of the connecting rod 40 to the crank 38 is provided a bearing (not shown) whose outer race is fitted to the connecting rod 40 and inner race is fixed in the elongated aperture 38a of the crank 38 by means of bolt 42 passing through the elongated aperture 38a and a nut 43 threadedly engaged with the bolt 42. The pivotal portion of the connecting rod 40 to the crank 38 is thus positionally adjustable to any position along the elongated aperture 38a in the centrifugal direction.

The driving means for the movable guide plate 11 is constructed as above described. When the motor 37 is energized to rotate the crank 38, the movable guide plate 11 is reciprocatively moved together with the slide member 33 and the support plate 34 by means of the connecting rod 40 pivotally connected to the crank 38.

The traverse distance of the movable guide plate 11 is simply changed by changing the pivotal position of the connecting rod 40 to the crank 38.

The cords 1 leaving the movable guide plate 11 and reciprocatively moved are embraced and pressed between the rubber sheets 20 supplied from above and below at the pressing position of the pressing rolls 13 and 14.

Figure 9:
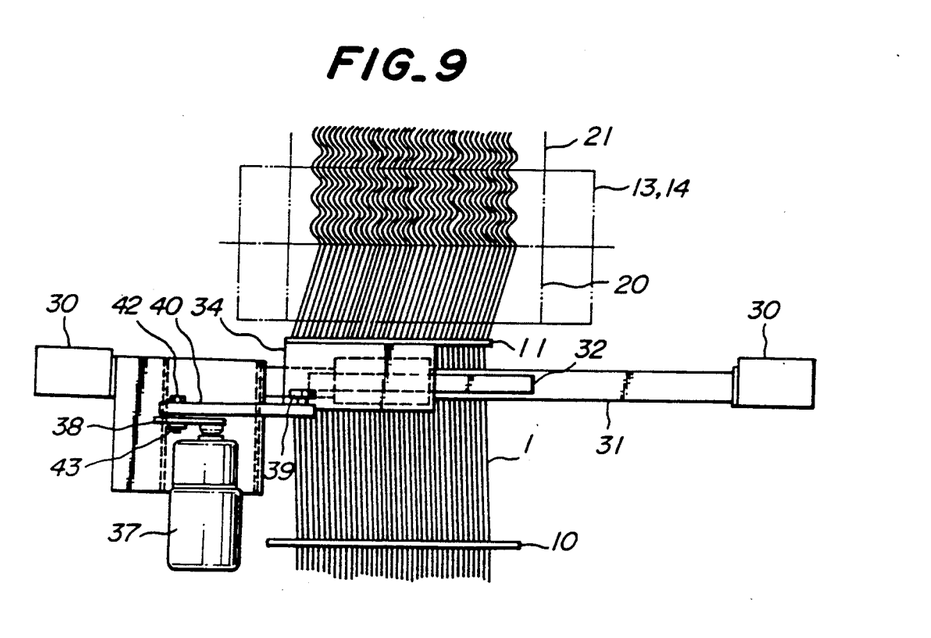
FIG. 9 is a partially removed plan view illustrating driving means for the movable guide plate.

As shown in FIG. 9, therefore, the cords 1 passed through the movable guide plate 11 are pulled at the pressing position of the pressing rolls 13 and 14 so that the cords 1 extend linearly in parallel with each other between the movable guide plate 11 and the pressing rolls 13 and 14. However, when the rubber sheets 20 are fed by the pressing rolls 13 and 14 in the cord advancing direction, the cords 1 are reciprocatively moved in the width directions of the rubber sheets 20 by the action of the movable guide plate 11. Therefore, positions of the cords 1 in the width directions at the pressing position are varied as a function of time, with the result that the cords 1 are shaped in wave-forms embraced by the rubber sheets 20 downstream of the pressing position.

In this case, the movable guide plate 11 is positioned immediately upstream of the pressing position of the pressing rolls 13 and 14 for the rubber sheets 20 so that the distance between the movable guide plate 11 and the pressing position is as short as possible to prevent any slack in cords 1. Accordingly, it is possible to form uniform waves of the cords 1 embedded in the tire reinforcing member 21.

If slack may tend to occur, it can be prevented by rotating the bobbins 2 in rewinding directions as the case may be.

The amplitude of wave-forms of the cords 1 is determined by the traverse distance of the movable guide plate 11. Therefore a, change in amplitude of the wave-forms can be accomplished by changing the pivotal positions of the connecting rod 40 to the crank 38. On the other hand, the wave length can be readily changed by changing relative speeds between the rotating speeds of the pressing rolls 13 and 14 and the crank 38.

Therefore, the apparatus for carrying out the method according to the invention can provide reinforcing members having most suitably wave-shaped cords embedded therein for various kinds of tires only with the one apparatus. Accordingly, the method of the invention is superior in flexibility for meeting requirements in wide ranges.

The wave-forms of the cords 1 embedded in tire reinforcing members 21 are regular in width directions and uniform in shape. Accordingly, limiting design of construction of the tire is acceptable so that a light weight and inexpensive tire can be obtained.

Moreover, the forming of the waves of cords according to the invention is effected under the same physical conditions over the entire width of the reinforcing member, so that stress concentration is prevented and the life span of the tire may also be prolonged.

According to the invention, the forming of the waves of cords is accomplished by changing embracing positions between the pressing rolls 13 and 14 so that the previous permanent set of the cords 1 is not needed. Therefore, it is possible to use chemical fibers such as Kevlar which are difficult to be deformed so that the tire can be made light in weight.

In the invention, moreover, direct rubber coating of bare cords is possible.

The wave-forms of the cords 1 are formed on the same horizontal plane without overlapping of the cords so that the air does not accumulate at overlapping portions. Therefore, the problem of a tire due to separation of rubber sheets is completely prevented, which is caused by accumulated air.

Even in reinforcing members having particularly many cords with very narrow intervals of the cords, the cords do not overlap with each other, and rubber certainly flows between the cords by increasing the pressing force to an extent so that direct contact of the cords is prevented.

Moreover, production efficiency can be raised by adopting four-calenders and the like having functions of long bobbins and rubber sheets.

In view of installation, the production efficiency is high relative to investment in installation, thereby enabling cost of tire to be lowered.

As can be seen from the above explanation, according to the invention in addition to steel cords, chemical fibers such as Kevlar which undergo not do plastic deformation can be used and therefore obtain light weight tires.

As the embedded cords are shaped into wave-forms regular in width directions and uniform in wave-form, uniform reinforcing members are obtained in which stresses are distributed uniformly in width directions. Therefore, safety in tire construction design is improved and the life of tire can be prolonged.

Moreover, rigidities of wave-formed cords and rubber sheets can be properly set according to the invention so that improvement of various performances of tires is expected.

A plurality of cords are arranged in the same plane to be embedded in the rubber sheets without overlapping so that reinforcing members having uniform thicknesses are formed. Therefore, there are very few reinforcing members deviating from predetermined thicknesses and separation of rubber sheets due to accumulated air can be prevented.

As an installation is relatively inexpensive, reduction of cost of tire production is expected.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of producing a tire reinforcing member comprising steps of: passing soft chemical fiber cords through a guide plate having a plurality of small apertures, each aperture for one of the cords to arrange said cords in a predetermined positional relation, winding the cores about braking means to apply a tensile force on said cords, extending the cords about a dancer roller, passing said cords in parallel and uniplanar to each other in a plane through a plurality of small apertures of a movable guide plate, each aperture in said guide plate for one of the cords, reciprocatively moving said guide plate in horizontal directions perpendicular to advancing directions of the cords, and feeding the cords reciprocatively moved by the movable guide plate into a calendar for rubber coating provided closely adjacent the movable guide plate to embrace the cords in the form of water without overlapping said cords between rubber sheets and coat the cords by the rubber sheets, thereby obtaining said tire reinforcing member.

2. A method of producing a tire reinforcing member as set in claim 1, wherein said dancer roller hangs by the cords from a pair of fixed rollers arranged upstream and downstream of the dancer roller to force the cords downward by force of gravity on the dancer roller, thereby taking up slack in the cords.

3. A method of producing a tire reinforcing member as set forth in claim 1, wherein said calander comprises upper and lower pressing rolls and a pair of upper and lower feeding rolls for supplying the rubber sheets between the pressing rolls, thereby feeding the cords between the rubber sheets fed from the upper and lower feeding rolls.

4. A method of producing a tire reinforcing member as set forth in claim 1, wherein amplitudes of waves of the cords are modified by changing a traverse distance of the movable guide plate during reciprocative movement.

5. A method of producing a tire reinforcing member as set forth in claim 1, wherein periods of waves of the cords are modified by changing relative speeds between rotating speed of the calender and reciprocatively moving speed of the movable guide plate.

* * * * *